A. E. FISHER.
AUTOMATIC REVERSE FOR PLANERS AND THE LIKE.
APPLICATION FILED NOV. 5, 1912.
1,073,033. Patented Sept. 9, 1913.
2 SHEETS—SHEET 1.
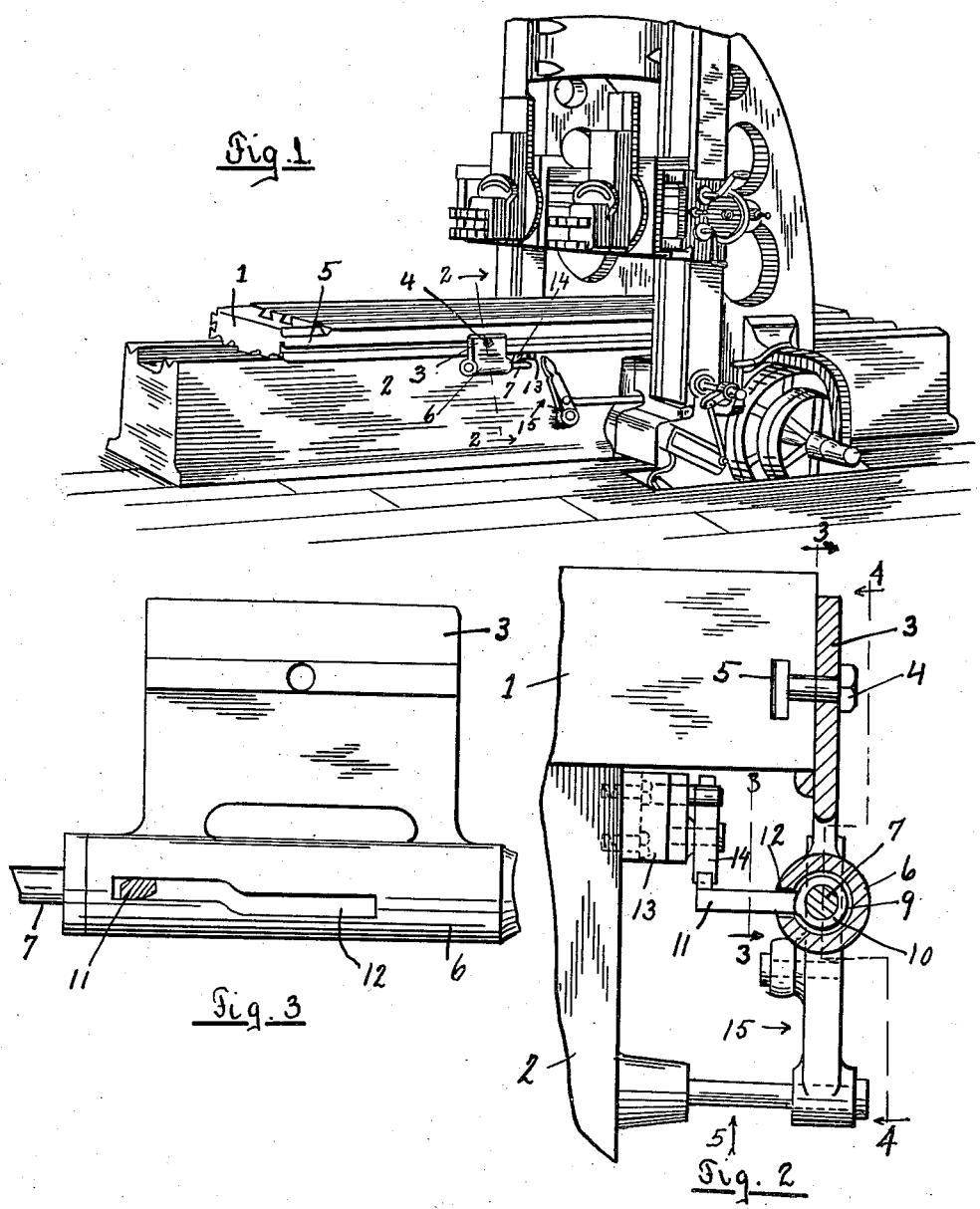
Witnesses
Frank Waterfield
Bertha McMaster
Inventor
Alfred E. Fisher.
by Semer G. Wells
Attorney A. E. FISHER.
AUTOMATIC REVERSE FOR PLANERS AND THE LIKE.
APPLICATION FILED NOV. 5, 1912.

1,073,033.

Patented Sept. 9, 1913.

2 SHEETS—SHEET 2.

Witnesses
Frank Waterfield
Bertha McMaster

Inventor
Alfred E. Fisher
by Semer G. Wells,
Attorney.

UNITED STATES PATENT OFFICE.

ALFRED E. FISHER, OF INGLEWOOD, CALIFORNIA.

AUTOMATIC REVERSE FOR PLANERS AND THE LIKE.

1,073,033.   Specification of Letters Patent.   Patented Sept. 9, 1913.

Application filed November 5, 1912. Serial No. 729,608.

*To all whom it may concern:*

Be it known that I, ALFRED E. FISHER, a citizen of the United States, residing at Inglewood, county of Los Angeles, State of California, have invented a new and useful Automatic Reverse for Planers and the Like, of which the following is a specification.

My object is to make a device for shifting belts or the like which will store up energy to be discharged with a powerful impulse, so that a planer or the like may be run full force right to the stopping point and the stored up energy discharged to reverse; and my invention consists of the novel features herein shown, described and claimed.

Figure 4:
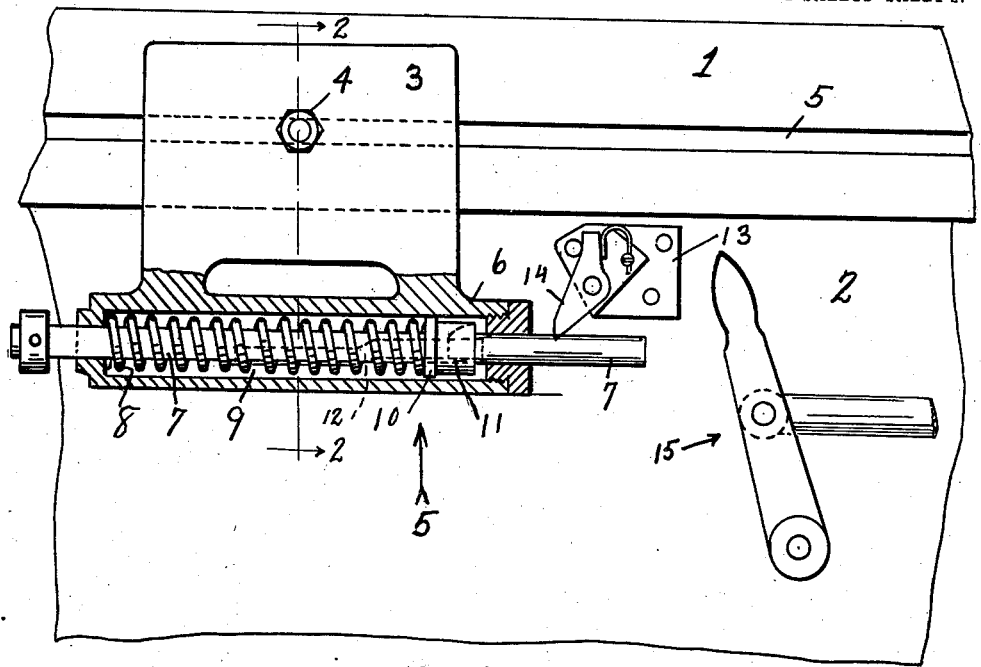
Figure 5:
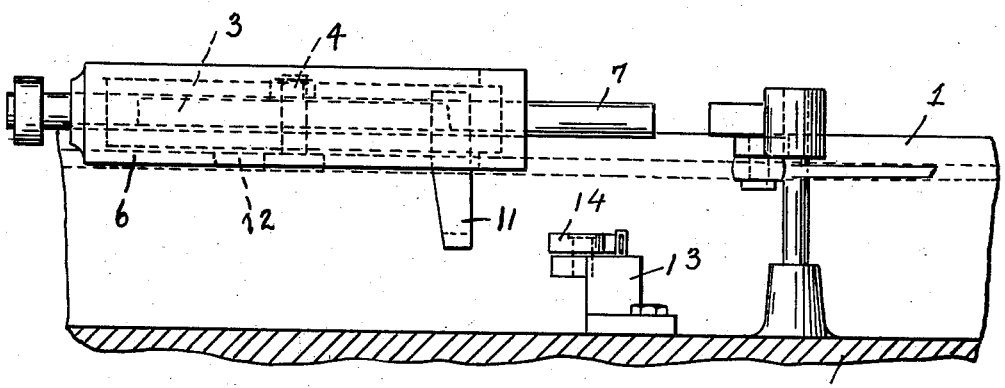

Figure 1 is a perspective view of a planer equipped with my quick automatic reverse. Fig. 2 is an enlarged cross sectional detail on the line 2—2 in Fig. 1. Fig. 3 is a longitudinal sectional detail on the line 3—3 of Fig. 2. Fig. 4 is a longitudinal sectional detail on the line 4—4 of Fig. 2. Fig. 5 is a bottom plan view as indicated by the arrows 5 in Figs. 2 and 4.

Referring to the drawings in detail, the traveling planer bed 1 rests upon the supporting bed 2. The reversing frame 3 is adjustably mounted upon the side edge of the planer bed 2 by a bolt 4 mounted to slide in the T-slot 5. The plunger barrel 6 is carried by the frame 3 and the reversing plunger 7 is slidably mounted longitudinally through the plunger barrel. The expansive coil spring 8 is mounted around the plunger 7 in chamber 9 of the barrel 6, one end of the spring pressing against the end of the chamber and the other end of the spring pressing against the collar 10 fixed upon the plunger 7. The compressing arm 11 extends from the collar 10 through the cam slot 12 in the barrel 6, said cam slot 12 being offset at its center, so that the arm will travel in a straight line to the offset and then move laterally. The trip frame 13 is rigidly mounted upon the supporting bed 2 and the spring-actuated tripping dog 14 is mounted upon the frame 13 in position to engage the arm 11 when the planer bed 1 moves backwardly, thereby holding the arm 11 and compressing the spring 8 until the arm 11 reaches the offset in the cam slot 12 and then the arm 11 moves laterally out of engagement with the tripping dog 14 and snaps by and the energy of the spring is released and the plunger shoots back and strikes the belt-shifting mechanism 15. On the forward movement of the bed 1 the tripping dog 14 will yield and the arm 11 will pass.

The mechanism may be set to release the plunger at the instant the tool reaches the stopping point, and the reversing operation is automatic and instantaneous.

My device is used for reversing the planer at the end of the cut. The ordinary reversing mechanism may be used for the other end.

The details of construction may be varied in many ways without departing from the spirit of my invention as set up in the following claims.

I claim—

1. The combination with a planer bed or the like, of a frame adjustably mounted upon the bed, a plunger barrel upon the frame, and having a cam slot, a reversing plunger mounted in the plunger barrel, a spring for operating the plunger one way, a compressing arm extending from the plunger through the cam slot, a trip pivot rigidly mounted, a spring actuated tripping dog upon the trip pivot in position to engage the compressing arm, so that when the frame moves one way the tripping dog will compress the spring until the cam action moves the compressing arm out of engagement with the tripping dog and allows the spring to shoot the plunger.

2. The combination with a planer bed or the like, of a frame adjustably mounted upon the bed, a plunger barrel upon the frame and having a cam slot, a reversing plunger mounted in the plunger barrel, a spring for operating the plunger one way, a compressing arm extending from the plunger through the cam slot, a trip pivot rigidly mounted, a spring actuated tripping dog upon the trip pivot in position to engage the compressing arm one way and slip over the other way and adapted to be thrown into and out of action, so that when the frame moves one way the tripping dog will compress the spring until the cam action moves the compressing arm out of engagement with the tripping dog and allows the spring to shoot the plunger.

ALFRED E. FISHER.

Witnesses:
WM. A. SCHIPPER,
BERTHA MCMASTER.

Copies of this patent may be obtained for five cents each, by addressing the "Commissioner of Patents, Washington, D. C."